US012601373B2

(12) United States Patent
Yan et al.

(10) Patent No.: US 12,601,373 B2
(45) Date of Patent: Apr. 14, 2026

(54) REFRIGERANT COMPRESSOR INCLUDING GROOVED AUXILIARY BEARING INTERFACE

(71) Applicant: Danfoss A/S, Nordborg (DK)

(72) Inventors: Jin Yan, Tallahassee, FL (US); Karthik Krishna, Tallahassee, FL (US)

(73) Assignee: Danfoss A/S, Nordborg (DK)

( * ) Notice: Subject to any disclaimer, the term of this patent is extended or adjusted under 35 U.S.C. 154(b) by 213 days.

(21) Appl. No.: 18/401,825

(22) Filed: Jan. 2, 2024

(65) Prior Publication Data

US 2024/0247686 A1      Jul. 25, 2024

Related U.S. Application Data

(60) Provisional application No. 63/440,449, filed on Jan. 23, 2023.

(51) Int. Cl.
F16C 32/04 (2006.01)
F25B 31/02 (2006.01)
H02K 7/09 (2006.01)

(52) U.S. Cl.
CPC ........ F16C 32/0474 (2013.01); F25B 31/026 (2013.01); H02K 7/09 (2013.01); *F16C 2360/00* (2013.01)

(58) Field of Classification Search
CPC .............. F16C 32/0474; F16C 2360/00; F16C 2360/44; F16C 32/0442; F16C 2360/42;

F16C 2362/52; F16C 33/583; F25B 31/026; H02K 7/09; F04D 29/056; F04D 29/053; F04D 29/059
USPC ........................................................ 310/90.5
See application file for complete search history.

(56) References Cited

U.S. PATENT DOCUMENTS

| | | | | |
|---|---|---|---|---|
| 5,700,092 | A * | 12/1997 | Wasson | F16C 32/0659 |
| | | | | 384/115 |
| 5,715,116 | A * | 2/1998 | Moritan | H02K 5/1675 |
| | | | | 310/90 |
| 5,997,180 | A * | 12/1999 | Ishizuka | F16C 33/1075 |
| | | | | 384/118 |
| 6,400,052 | B1 * | 6/2002 | Suzuki | F16C 33/1065 |
| | | | | 310/90 |
| 6,955,472 | B2 * | 10/2005 | Rudd | F16C 33/1065 |
| | | | | 384/115 |
| 2008/0185928 | A1* | 8/2008 | Buhler | F16C 3/02 |
| | | | | 310/90.5 |
| 2009/0289511 | A1* | 11/2009 | Kim | F04D 29/668 |
| | | | | 384/115 |
| 2016/0084307 | A1* | 3/2016 | Bennett | F16C 33/121 |
| | | | | 384/114 |
| 2020/0049200 | A1* | 2/2020 | Zhong | F16C 33/6651 |
| 2020/0292293 | A1* | 9/2020 | Sakawaki | F04D 25/06 |
| 2020/0362916 | A1* | 11/2020 | Poirier | F16C 19/06 |
| 2024/0247686 | A1* | 7/2024 | Yan | F16C 32/0474 |

* cited by examiner

*Primary Examiner* — Ahmed Elnakib
(74) *Attorney, Agent, or Firm* — Carlson, Gaskey & Olds, P.C.

(57) ABSTRACT

A refrigerant compressor may include an auxiliary bearing arranged about a shaft. An interface of the auxiliary bearing and the shaft includes at least one groove.

15 Claims, 4 Drawing Sheets

REFRIGERANT COMPRESSOR INCLUDING GROOVED AUXILIARY BEARING INTERFACE

RELATED APPLICATIONS

This application claims the benefit of U.S. Provisional Application No. 63/440,449, filed Jan. 23, 2023, the entirety of which is herein incorporated by reference.

TECHNICAL FIELD

This disclosure relates to a refrigerant compressor including a grooved auxiliary bearing interface. The compressor is used in a heating, ventilation, and air conditioning (HVAC) chiller system, for example.

BACKGROUND

Refrigerant compressors are used to circulate refrigerant in a chiller via a refrigerant loop. Refrigerant loops are known to include a condenser, an expansion device, and an evaporator. The compressor compresses the fluid, which then travels to a condenser, which in turn cools and condenses the fluid. The refrigerant then goes to an expansion device, which decreases the pressure of the fluid, and to the evaporator, where the fluid is vaporized, completing a refrigeration cycle.

Many refrigerant compressors are centrifugal compressors and have an electric motor that drives at least one impeller to compress refrigerant. Refrigerant flows into the impeller in an axial direction, and is expelled radially from the impeller toward a diffuser. Within the diffuser, the refrigerant broadens and reduces its speed, resulting in an increase in pressure.

Some centrifugal refrigerant compressors include impellers supported on a rotor shaft by a magnetic bearing system, which typically includes radial and axial magnetic bearings. In some compressors, radial magnetic bearings apply radial forces to the shaft, and axial magnetic bearings apply axial magnetic forces to the shaft.

SUMMARY

In some aspects, the techniques described herein relate to a refrigerant compressor, including: an auxiliary bearing arranged about a shaft, wherein an interface of the auxiliary bearing and the shaft includes at least one groove.

In some aspects, the techniques described herein relate to a refrigerant compressor, further including: a magnetic bearing assembly including a plurality of magnetic bearings, wherein the magnetic bearings are configured to create a magnetic field to levitate the shaft during operation of the refrigerant compressor, wherein the auxiliary bearing is not a magnetic bearing.

In some aspects, the techniques described herein relate to a refrigerant compressor, wherein, when the magnetic bearing assembly holds a radial load of the shaft, the auxiliary bearing is not in contact with the shaft.

In some aspects, the techniques described herein relate to a refrigerant compressor, wherein, when the auxiliary bearing contacts the shaft, the auxiliary bearing is configured to support and rotate with the shaft.

In some aspects, the techniques described herein relate to a refrigerant compressor, wherein the auxiliary bearing is a rotary bearing.

In some aspects, the techniques described herein relate to a refrigerant compressor, wherein the auxiliary bearing includes an inner race, an outer race, and a plurality of rollers.

In some aspects, the techniques described herein relate to a refrigerant compressor, wherein the rollers are balls.

In some aspects, the techniques described herein relate to a refrigerant compressor, wherein the interface of the auxiliary bearing and the shaft includes a plurality of grooves.

In some aspects, the techniques described herein relate to a refrigerant compressor, wherein the plurality of grooves includes at least one of (i) a first plurality of grooves formed in the inner race and (ii) a second plurality of grooves formed in the shaft.

In some aspects, the techniques described herein relate to a refrigerant compressor, wherein the plurality of grooves includes both (i) a first plurality of grooves formed in the inner race and (ii) a second plurality of grooves formed in the shaft.

In some aspects, the techniques described herein relate to a refrigerant compressor, wherein: each of the first plurality of grooves is axially spaced-apart from the others of the first plurality of grooves, and each of the second plurality of grooves is axially spaced-apart from the others of the second plurality of grooves.

In some aspects, the techniques described herein relate to a refrigerant compressor, wherein each of the first plurality of grooves is axially aligned with a corresponding one of the second plurality of grooves.

In some aspects, the techniques described herein relate to a refrigerant compressor, wherein each of the first plurality of grooves and the second plurality of grooves is arch-shaped.

In some aspects, the techniques described herein relate to a refrigerant compressor, wherein each of the first plurality of grooves is recessed inwardly relative to the inner race by a distance about 25% of a radial dimension of the inner race.

In some aspects, the techniques described herein relate to a refrigerant compressor, wherein the second plurality of grooves are sized and shaped substantially the same as the first plurality of grooves.

In some aspects, the techniques described herein relate to an auxiliary bearing configured to be arranged relative to a shaft of a refrigerant compressor, including: an inner race, an outer race, and a plurality of rollers, wherein the inner race includes at least one groove.

In some aspects, the techniques described herein relate to a refrigerant compressor, wherein the inner race includes a plurality of grooves.

In some aspects, the techniques described herein relate to a refrigerant compressor, wherein each of the grooves is axially spaced-apart from one another.

In some aspects, the techniques described herein relate to a refrigerant compressor, wherein each of the grooves is arch-shaped.

In some aspects, the techniques described herein relate to a refrigerant compressor, wherein each of the grooves is recessed inwardly relative to the inner race by a distance about 25% of a radial dimension of the inner race.

DETAILED DESCRIPTION

Figure 1:
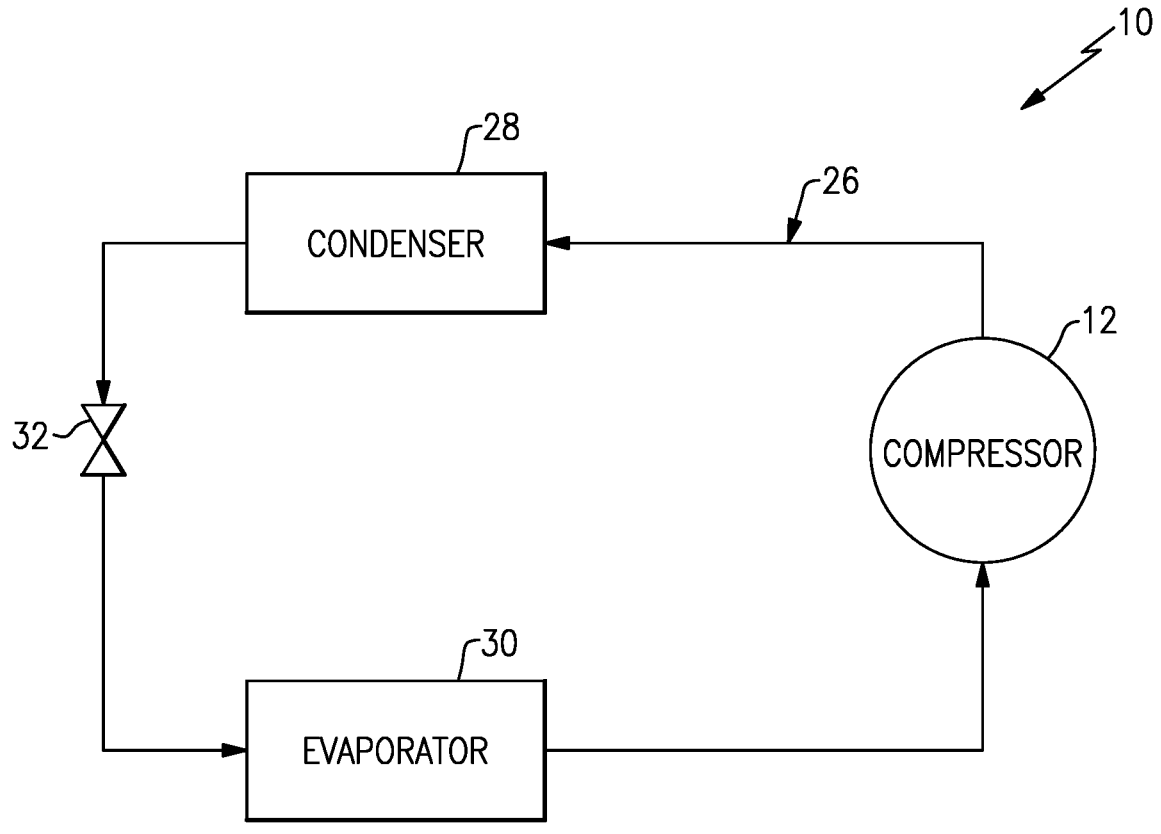
FIG. 1 schematically illustrates a refrigerant system.
Figure 2:
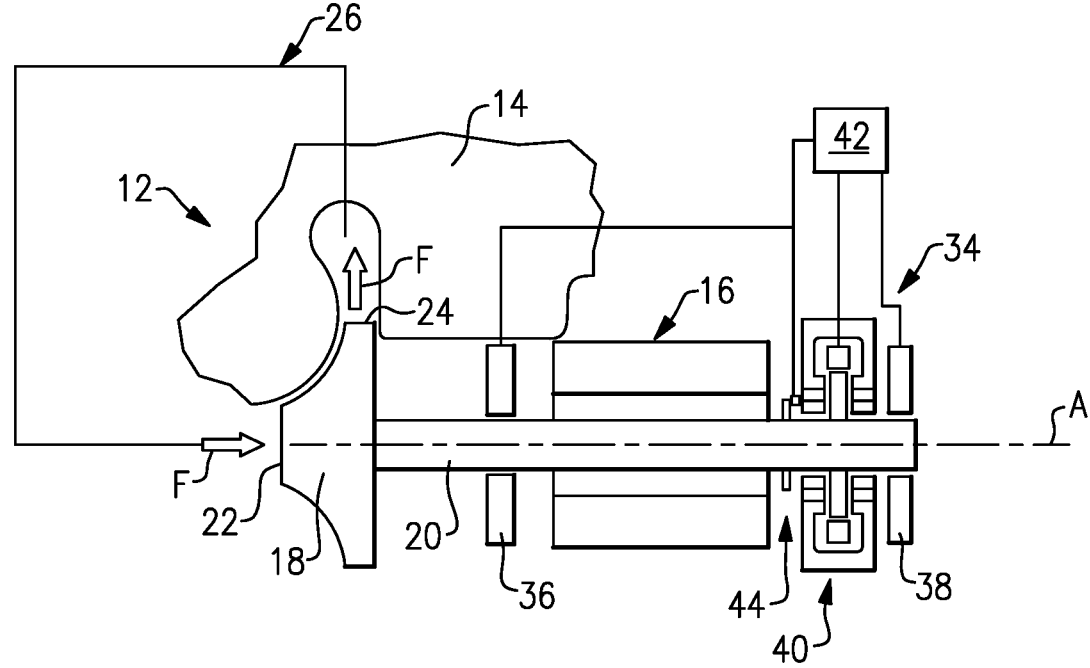
FIG. 2 schematically illustrates a portion of a compressor.

Referring to FIGS. 1 and 2, a refrigeration system 10 includes a centrifugal refrigerant compressor 12 ("compressor 12") for circulating a flow of fluid F, which in this example is refrigerant. An example compressor 12 is shown in more detail in FIG. 2, and includes a housing 14 within which an electric motor 16 is arranged. The housing 14 is schematically depicted and may comprise one or more pieces. The electric motor 16 rotationally drives an impeller 18 via a shaft, or rotor shaft, 20 about a central axis A ("axis A") to compress the refrigerant.

The impeller 18 includes an inlet 22 and an outlet 24. As shown in FIG. 2, the inlet 22 is arranged axially, and the outlet 24 is arranged radially. Although only one impeller is illustrated, the compressor 12 can include multiple impellers.

The compressor 12 is in fluid communication with a refrigerant loop 26 that circulates refrigerant to a load, such as a chiller. As shown in FIG. 1, the refrigerant loop 26 includes a condenser 28, an evaporator 30, and an expansion device 32. While a particular example of the refrigeration system 10 is shown in FIG. 1, this application extends to other refrigerant system configurations. Further, this disclosure extends to compressors that are used relative to refrigerant loops that do not contain a chiller. For example, the refrigerant loop 26 can include an economizer downstream of the condenser 28 and upstream of the expansion device 32.

An oil-free bearing arrangement is provided for support of the shaft 20 so that oil-free refrigerant can be used to thermally manage (i.e., cool) the compressor 12, namely the electric motor 16. In the example, the shaft 20 is rotationally supported relative to the housing 14 by a magnetic bearing assembly 34. The magnetic bearing assembly 34, in this example, includes two radial magnetic bearings 36, 38 configured to support and/or adjust a radial position of the shaft 20. The term "radial" is used herein with reference to the axis A and is generally up-and-down in FIG. 2. This disclosure is not limited to any particular details of the radial magnetic bearings 36, 38. The magnetic bearing assembly 34 further includes an axial magnetic bearing 40 configured to support and/or adjust an axial position of the shaft 20.

A controller 42 communicates with the magnetic bearing assembly 34, and in particular receives signals from components of the magnetic bearing assembly 34 and is configured to provide instructions to the components of the magnetic bearing assembly 34. In particular, the controller 42 is configured to selectively issue instructions to activate one or more electromagnets associated with the radial and/or axial magnetic bearings 36, 38, 40. In response to those instructions, the magnetic bearing assembly 34 creates a magnetic field levitating the shaft 20 and controls its characteristics, including steadying the shaft 20 by continually monitoring and adjusting the radial and/or axial position of the shaft 20, during operation of the compressor 12.

The controller 42 is depicted schematically, and may include one or more controllers that are located remotely from or near to one another. The controller 42 may include hardware and/or software. The controller 42 maybe electrically connected to the various components of the magnetic bearing assembly 34 via wired and/or wired connections. The controller 42 may also be electrically connected to, and be configured to receive signals from and send instructions to, other components of the compressor 12 other than the magnetic bearing assembly 34.

In this example, the compressor 12 further includes an auxiliary bearing 44 that is not a magnetic bearing. The auxiliary bearing 44 is arranged about the shaft 20. In this example, with reference to FIGS. 3 and 4, the auxiliary bearing 44 is a rotary bearing including an inner race 46, an outer race 48, and a plurality of rollers 50, which may be balls, between the inner and outer races 46, 48.

Figure 3:
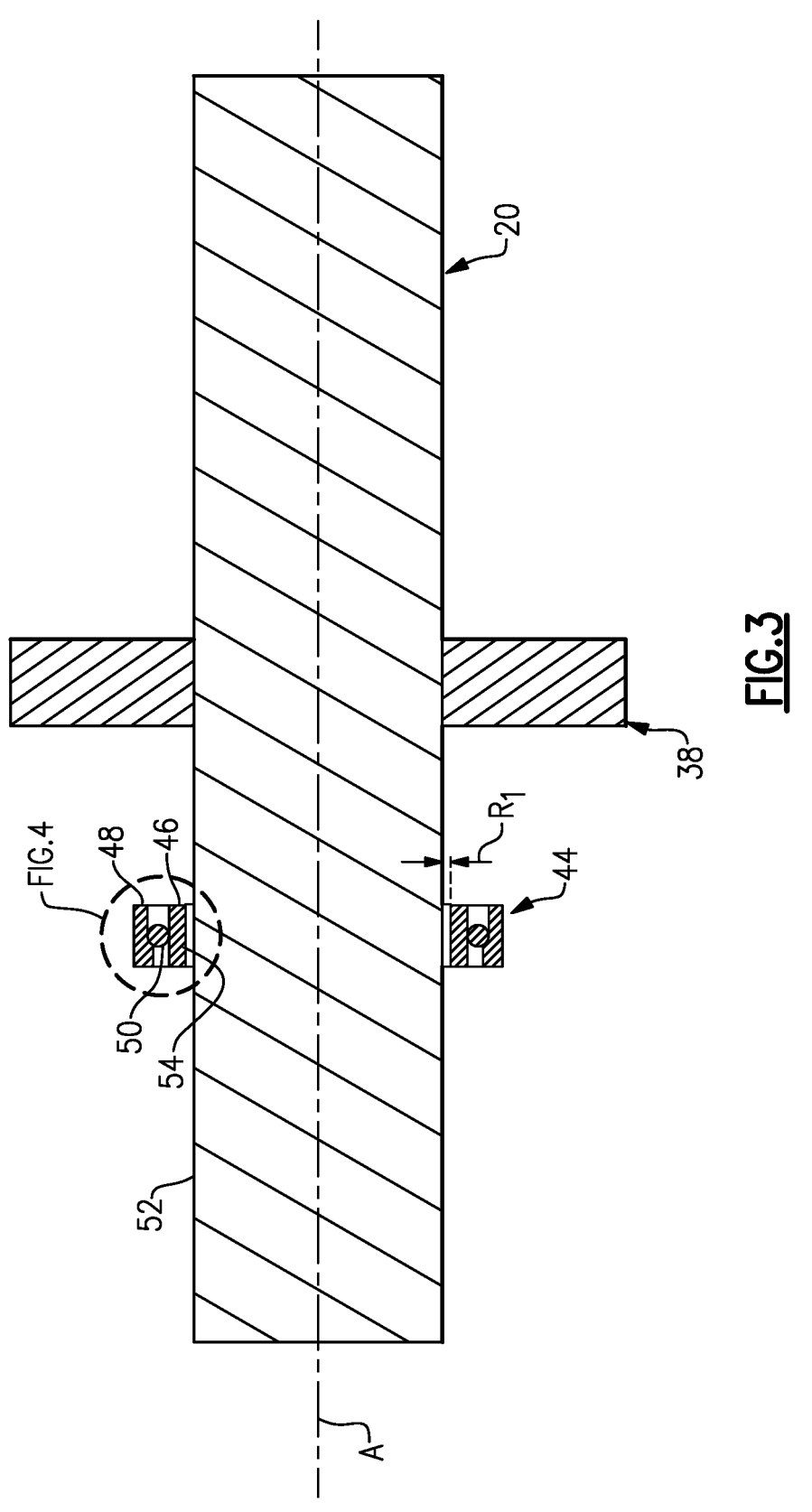
FIG. 3 is view of an example bearing arrangement.
Figure 4:
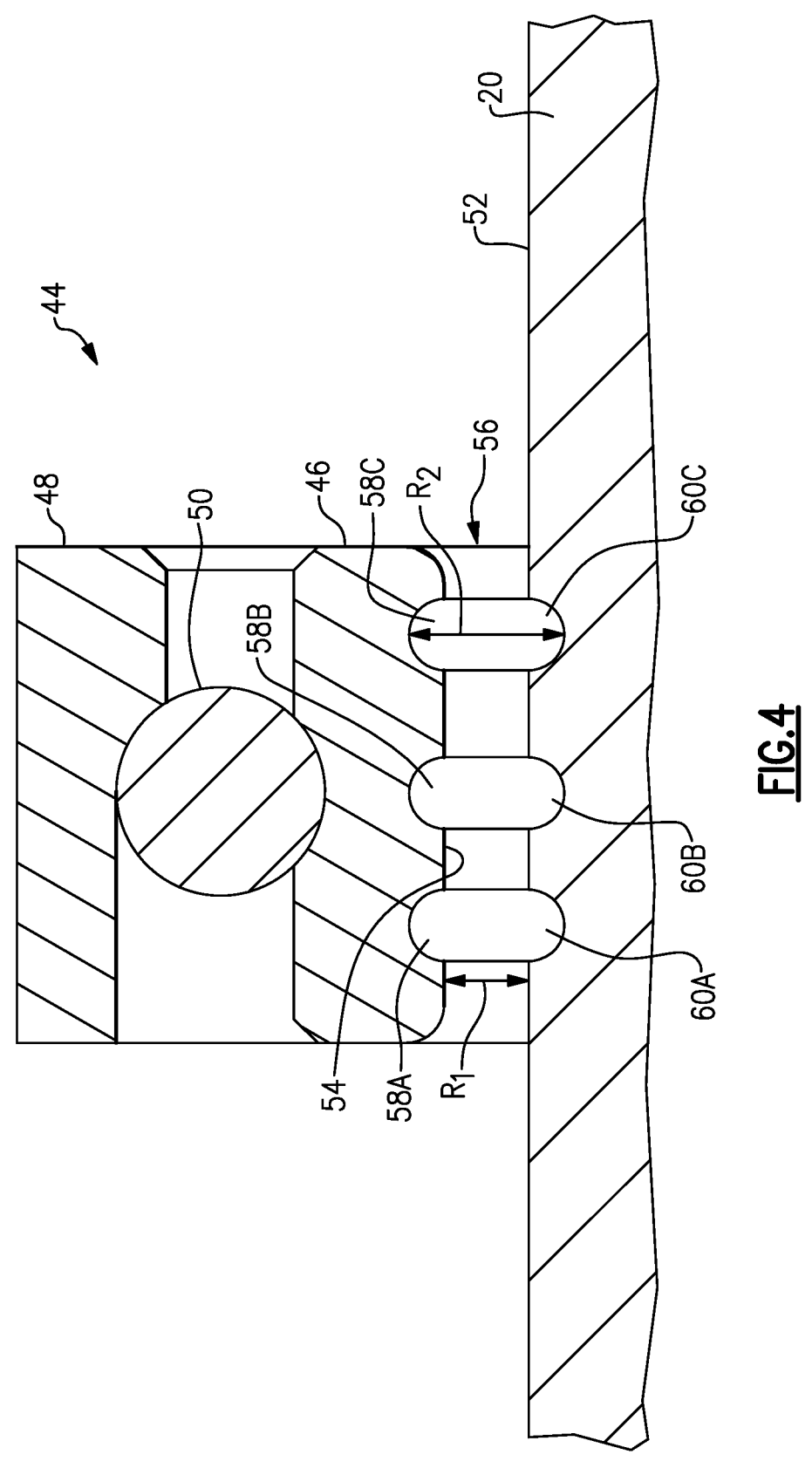
FIG. 4 is a close-up view of an auxiliary bearing interface.

When the magnetic bearing assembly 34, and in particular the magnetic bearing 38, holds the radial load of the shaft 20, the auxiliary bearing 44 is not in contact with the shaft 20. As shown in FIGS. 3 and 4, when the magnetic bearing assembly 34 is holding the radial load of the shaft 20, there is first radial gap $R_1$ between an radially outermost surface 52 of the shaft 20 and a radially innermost surface 54 of the inner race 46.

In conditions when the radially outermost surface 52 of the shaft 20 comes into contact with the radially innermost surface 54 of the inner race, the auxiliary bearing 44 is configured to support and rotate with the shaft 20. That said, rotation of the auxiliary bearing 44 is not desired unless there is direct contact between the shaft 20 and the auxiliary bearing 44.

In this disclosure, rotation of the auxiliary bearing 44 by viscous shear forces of fluid adjacent the auxiliary bearing 44 is resisted by providing one or more grooves at the interface 56 of the shaft 20 and the auxiliary bearing 44. The grooves do not compromise the structural integrity of the shaft 20 or auxiliary bearing 44. Further still, despite adding the grooves, the interface 56 still exhibits the first radial gap $R_1$ at some axial locations along the interface 56, such that the same radial movement of the shaft 20 will result in direct contact the auxiliary bearing 44 as if the grooves were not present.

In this example, the inner race 46 includes three axially spaced-apart grooves 58A-58C and the shaft 20 include three axially spaced-apart grooves 60A-60C. The grooves 60A-60C are axially aligned with the grooves 58A-58C in this example. While grooves are shown in both the inner race 46 and the shaft 20 in FIG. 4, this disclosure extends to examples in which the interface 56 includes grooves in only one of the inner race 46 or the shaft 20.

The interface 56 exhibits a second radial gap $R_2$ greater than the first radial gap $R_1$ at the location of the grooves 58A-58C, 60A-60C. The increased radial gap $R_2$ resists viscous shear forces of fluid on the auxiliary bearing 44, which in turn resists rotation of the auxiliary bearing 44 when the auxiliary bearing 44 is not in contact with the shaft 20. Specifically, the increased radial gap $R_2$ reduces the shear driven velocity gradients by viscous dissipation.

In this example, the grooves 58A-58C, 60A-60C are arch-shaped and are open facing toward the interface 56. Specifically, with respect to the grooves 58A-58C, they are defined as half-circle shapes in this example, with a center of the half-circle co-planar with the radially innermost surface 54. Further, with respect to the grooves 58A-58C, the grooves 58A-58C are recessed radially relative to the radially innermost surface 54 by a distance equal to about 25% of the radial dimension of the inner race 46. The grooves 60A-60C are sized and shaped substantially the same as the grooves 58A-58C.

It should be understood that terms such as "axial" and "radial" are used above with reference to the normal operational attitude of a compressor. Further, these terms have been used herein for purposes of explanation, and should not be considered otherwise limiting. Terms such "generally,"

"about," and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A refrigerant compressor, comprising:
an auxiliary bearing arranged about a shaft, wherein an interface of the auxiliary bearing and the shaft includes at least one groove; and
a magnetic bearing assembly including a plurality of magnetic bearings, wherein the magnetic bearings are configured to create a magnetic field to levitate the shaft during operation of the refrigerant compressor, wherein the auxiliary bearing is not a magnetic bearing, wherein, when the magnetic bearing assembly holds a radial load of the shaft, the auxiliary bearing is not in contact with the shaft and rotation of the auxiliary bearing brought about by forces of refrigerant adjacent the auxiliary bearing is resisted by the at least one groove.

2. The refrigerant compressor as recited in claim 1, wherein, when the auxiliary bearing contacts the shaft, the auxiliary bearing is configured to support and rotate with the shaft.

3. The refrigerant compressor as recited in claim 1, wherein the auxiliary bearing is a rotary bearing.

4. The refrigerant compressor as recited in claim 3, wherein the auxiliary bearing includes an inner race, an outer race, and a plurality of rollers.

5. The refrigerant compressor as recited in claim 4, wherein the rollers are balls.

6. The refrigerant compressor as recited in claim 4, wherein the interface of the auxiliary bearing and the shaft includes a plurality of grooves.

7. The refrigerant compressor as recited in claim 6, wherein the plurality of grooves includes at least one of (i) a first plurality of grooves formed in the inner race and (ii) a second plurality of grooves formed in the shaft.

8. A refrigerant compressor, comprising:
an auxiliary bearing arranged about a shaft, wherein an interface of the auxiliary bearing and the shaft includes at least one groove,
wherein the auxiliary bearing is a rotary bearing and includes an inner race, an outer race, and a plurality of rollers, and
wherein the interface of the auxiliary bearing and the shaft includes (i) a first plurality of grooves formed in the inner race and (ii) a second plurality of grooves formed in the shaft.

9. The refrigerant compressor as recited in claim 8, wherein:
each of the first plurality of grooves is axially spaced-apart from the others of the first plurality of grooves, and
each of the second plurality of grooves is axially spaced-apart from the others of the second plurality of grooves.

10. The refrigerant compressor as recited in claim 8, wherein each of the first plurality of grooves is axially aligned with a corresponding one of the second plurality of grooves.

11. The refrigerant compressor as recited in claim 8, wherein each of the first plurality of grooves and the second plurality of grooves is arch-shaped.

12. The refrigerant compressor as recited in claim 8, wherein each of the first plurality of grooves is recessed inwardly relative to the inner race by a distance about 25% of a radial dimension of the inner race.

13. The refrigerant compressor as recited in claim 12, wherein the second plurality of grooves are sized and shaped substantially the same as the first plurality of grooves.

14. An auxiliary bearing configured to be arranged relative to a shaft of a refrigerant compressor, comprising:
an inner race,
an outer race, and
a plurality of rollers,
wherein the inner race includes a plurality of grooves, wherein each of the grooves is axially spaced-apart from one another, and wherein each of the grooves is recessed inwardly relative to the inner race by a distance about 25% of a radial dimension of the inner race.

15. The refrigerant compressor as recited in claim 14, wherein each of the grooves is arch-shaped.

* * * * *